Feb. 23, 1954 F. S. GRUNWALD 2,670,400

SYNCHRONIZED ROTATING COLOR FILTERS

Filed Nov. 28, 1950 2 Sheets-Sheet 1

INVENTOR.
FRED S. GRUNWALD
BY Zoltan H. Polachek
ATTORNEY

Feb. 23, 1954 F. S. GRUNWALD 2,670,400

SYNCHRONIZED ROTATING COLOR FILTERS

Filed Nov. 28, 1950

2 Sheets-Sheet 2

INVENTOR.
FRED S. GRUNWALD

BY Zoltan Holachek
ATTORNEY

UNITED STATES PATENT OFFICE 2,670,400

SYNCHRONIZED ROTATING COLOR FILTERS

Fred S. Grunwald, Ozone Park, N. Y.

Application November 28, 1950, Serial No. 197,858

2 Claims. (Cl. 178—5.4)

This invention relates to a device for adapting existing black and white television receivers to the reception of color television transmitted in accordance with the CBS "color wheel" system.

Heretofore the reception of this type of color television required the utilization of a large transparent spinning disc comprised of radial segments of the three basic colors, said disc being placed between the viewer and the viewing screen and being rotated at the appropriate speed. The necessarily large diameter of a disc of the type described causes the same to be cumbersome and unsightly, and, therefore, unsatisfactory.

One object of the invention is the provision of a flat compact unit mountable adjacent a television receiver screen and adapted to perform the coloring function of said disc.

Another object of the invention is to construct said unit in such manner as to permit of the economical manufacture and sale thereof.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figures 1, 2, 5, 6, 7:
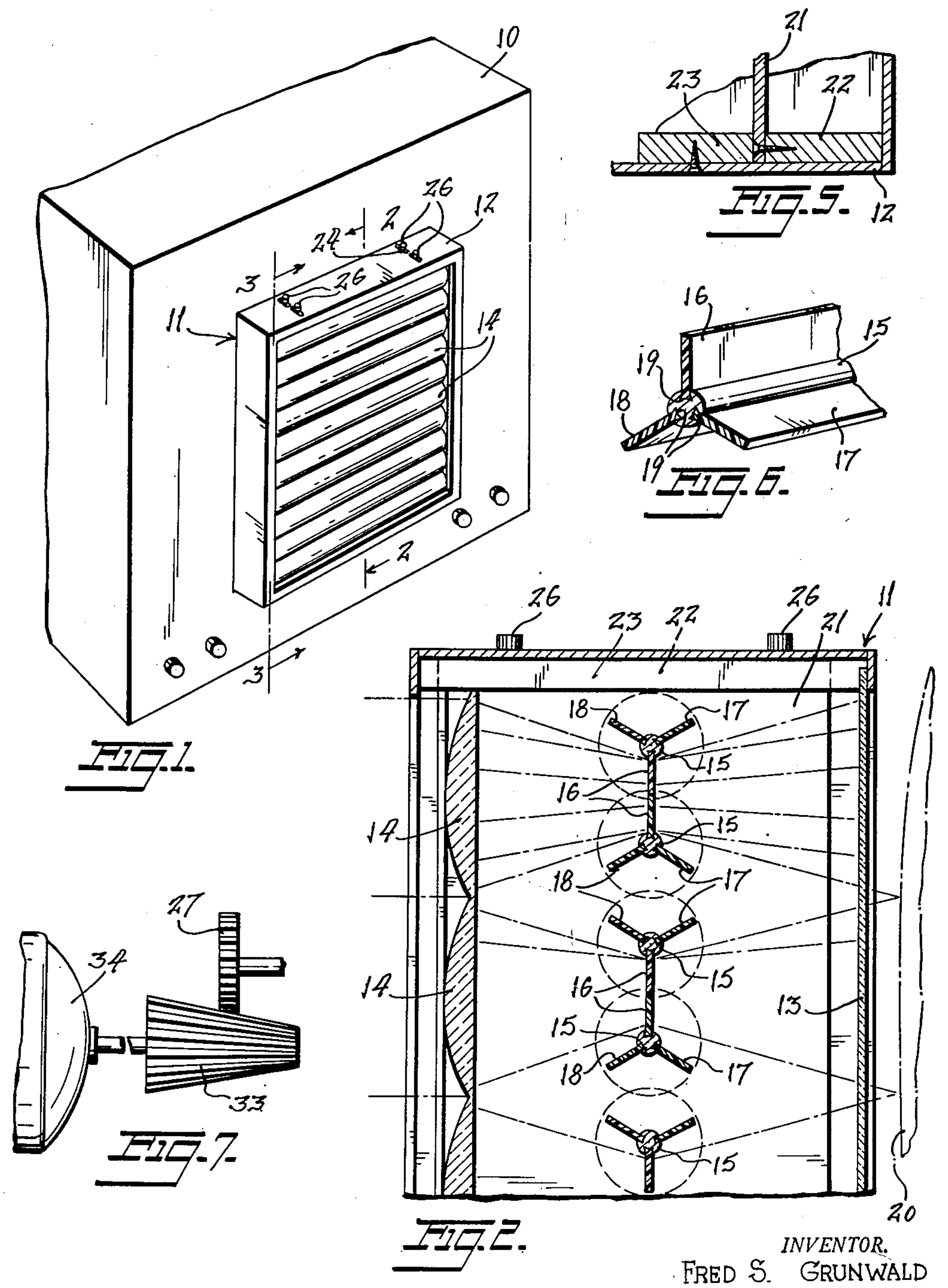
Fig. 1 is a fragmentary perspective view of a television receiver having a unit of the invention mounted thereon.
Fig. 2 is a fragmentary enlarged sectional view on line 2—2 of Fig. 1.
Fig. 5 is a fragmentary detail sectional view on line 5—5 of Fig. 3.
Fig. 6 is a fragmentary, perspective sectional view of a triblade element of the invention.
Fig. 7 is a detail view illustrating a modified gearing arrangement.

Referring to the drawings wherein an embodiment of the principle of the invention is illustrated, the reference numeral 10 indicates an ordinary black and white television receiver having color unit 11 mounted over the screen thereof. Color unit 11 may consist of a rigid frame 12 surrounding said screen and having a clear glass or plastic window 13 fixed therein adjacent said screen. The front of the unit consists of a glass or plastic lens 14 which is secured in place in any suitable way and which comprises a plurality of integral plano-convex cylindrical lenses extending horizontally across the width of the unit one above the other. The construction is such that lens 14 magnifies in a vertical direction only.

Mounted between lens 14 and window 13 are a plurality of shafts 15 in equiangularly spaced longitudinal grooves 19 in which are fixed three blades 16, 17 and 18. The blades 16, 17 and 18 are of transparent refractive material and each is of one of the three basic colors utilized in the CBS color television system. As shown each groove 19 may be wedge shaped and the edge of the blade engaged therein may be thickened to secure the blade to the shaft. The shafts are spaced above one another a distance designed to allow a minimum of clearance between the blades of both as the shafts rotate. As best shown in Fig. 2 a pair of shafts 15 is provided for each cylindrically convex section of lens 14, each pair of shafts being located symmetrically with respect to the associated lens section so that the upper and lower edges of said section are aligned with the highest and lowest points reached by the blades on said shafts.

The blades 16, 17 and 18 are positioned differently on each shaft of a pair so that as the shafts rotate in opposite directions as will be described thereinafter, the like blades of both shafts align vertically, edge to edge, once in each revolution. When a pair of blades line up in the manner described they present a substantially united colored strip extending across the screen 20 of the receiver centrally of the associated lens section.

The blades 16, 17 and 18 associated with the corresponding shaft of a set are located in the same angular position so that all blades of a given color are aligned vertically at the appropriate time. In accordance with the CBS color system the shafts 15 are rotated at a speed of 1440 revolutions per minute, so that all of the blades of a given color are aligned vertically 1440 times a minute.

Each section of lens 14 is of the proper size and curvature to deflect the light rays from the image on the television screen through the associated aligned pair of blades 16, 17 or 18. Preferably each blade is of prismatic cross section so that the said deflected lines are again deflected to take in a horizontal strip of screen 20 of the same size as and vertically aligned with the associated lens section. Like the lens sections, adjacent screen strips have a common edge.

The construction is such that an uninterrupted picture is viewed through lens 14, said picture, if the shafts 15 are rotating properly, being in color.

In order to provide for adjusting the distance between the shafts 15 and screen 20 to prevent overlapping of portions of the picture, the ends of said shafts are journalled in partitions 21 mounted in frame 12 for sliding movements front and rear. Each partition 21 has secured thereto at top and bottom a bar 22 which engages the side and the top or bottom wall of frame 12. A pair of second bars 23 secured one to the bottom wall and another to the top wall of the frame engage the inner face of each partition 21. The said partitions are, therefore, adequately guided for front and rear sliding movements. Above each top bar 22 a pair of front to rear slots 24 are provided in the top wall of the frame, said slots being engaged by screw 25 threaded into the bars 22 and having large knurled heads 26 to clamp against said top wall.

The construction is such that the screw heads 26 normally serve to secure the partitions 21 in their set positions but are loosenable to permit adjustment of said partitions.

Figure 3:
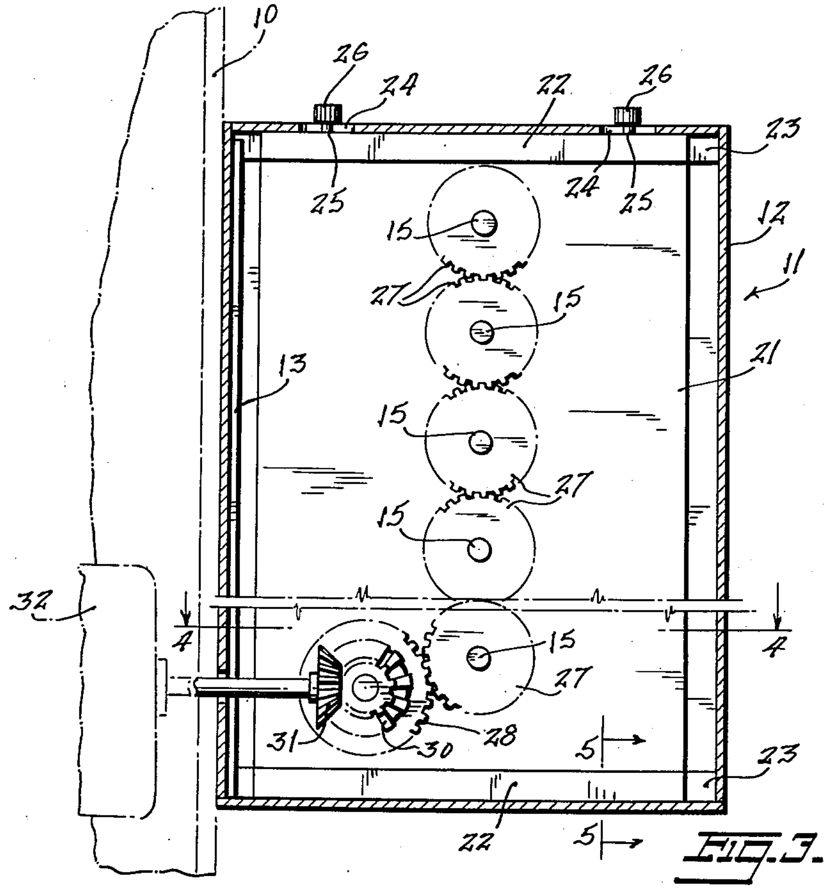
Fig. 3 is a fragmentary enlarged sectional view on line 3—3 of Fig. 1.
Figure 4:
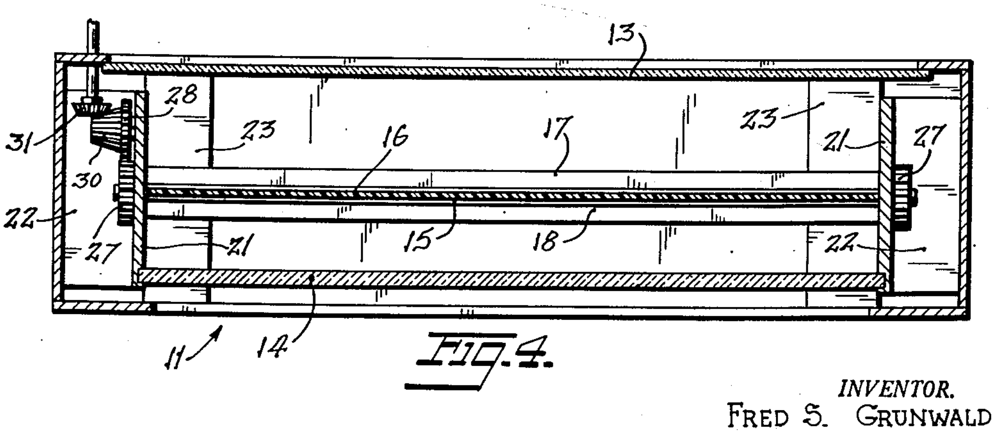
Fig. 4 is a sectional view on line 4—4 of Fig. 3, on a smaller scale.

In order to rotate the shafts 15 at the proper speed each is provided at either end with a gear 27 that meshes with a like gear on the adjacent shaft. The gear 27 at one end of the lowermost shaft 15 is suitably connected with any desired driving means. As shown in Fig. 3 said lowermost gear 27 may mesh with a gear 28 mounted on partition 21 and having a bevel gear 30 coaxial and rotatable therewith, the other bevel gear 31 of the pair being fixed on the shaft of an electric motor 32 located within the television receiver. Motor 32 is of course suitably controlled to run at the proper speed and is mounted for adjustment with the partitions 21.

If desired the lowermost gear 27 may be driven by a tapering or adjustable speed gear 33 on the shaft of a motor 34 (see Fig. 7) that may conveniently be adjustably mounted in an extension of color unit 11.

However, any means for driving the shafts 15 at the proper speed may be provided.

The faces of the blades 16 are to be shaped to reconstruct the original image that appears on the face of the receiver tube, but in the sequence of color as sent out by the transmitting station.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A color unit mountable in front of a black and white television screen comprising a shallow frame having side and end walls, a plurality of pairs of shafts rotatably mounted on the frame, three transparent blades secured equiangularly apart on each shaft, said blades extending longitudinally of the shafts, the shafts of each pair of shafts being vertically spaced for minimum clearance when their blades are aligned, each of the blades on a shaft being of a different basic color, a plurality of vertically aligned plano-convex lens sections, one lens section for each pair of shafts, said lens sections extending across the shafts and spaced in front of them with the upper and lower edges of each section aligned with the highest and lowest points reached by the blades on a pair of shafts, means operatively connecting the shafts to effect sequentially in the course of a single revolution thereof the vertical coplanar alignment of the correspondingly colored blades on each pair of shafts in said plurality thereof, said shafts, blades and connecting means being confined within the walls of the frame, and means to rotate the shafts at a predetermined speed corresponding to that which color images reach the television screen.

2. A color unit mountable in front of a black and white television screen comprising a frame having fixed side and end walls, a movable and adjustable partition adjacent each side wall, one of said end walls having spaced openings therein, a plurality of pairs of shafts rotatably mounted on the partitions, three transparent blades secured equiangularly apart on each shaft, said blades extending longitudinally of the shafts, the shafts of each pair of shafts being vertically spaced for minimum clearance when their blades are aligned, each of the blades on a shaft being of a different basic color, a plurality of vertically aligned plano-convex lens sections, one lens section for each pair of shafts, said lens sections extending across the shafts and spaced in front of them with the upper and lower edges of each section aligned with the highest and lowest points reached by the blades on a pair of shafts, means operatively connecting the shafts to effect sequentially in the course of a single revolution thereof the vertical coplanar alignment of the correspondingly colored blades on each pair of shafts in said plurality thereof, and means to rotate the shafts at a predetermined speed corresponding to that which color images reach the television screen, and knobs on the partitions and protruding through the openings in end wall to move said partitions to adjust the distance between the lens sections and the associated pairs of shafts.

FRED S. GRUNWALD.

References Cited in the file of this patent

UNITED STATES PATENTS

| Number | Name | Date |
|---|---|---|
| 586,799 | Nerz | July 20, 1897 |
| 2,302,147 | Schade | Nov. 17, 1942 |
| 2,346,988 | Noel | Apr. 18, 1944 |
| 2,524,828 | Parker | Oct. 10, 1950 |
| 2,531,399 | Cawein et al. | Nov. 28, 1950 |
| 2,538,071 | Young | Jan. 16, 1951 |
| 2,615,975 | Sziklai | Oct. 28, 1952 |

FOREIGN PATENTS

| Number | Country | Date |
|---|---|---|
| 67,726 | Austria | Jan. 25, 1915 |